United States Patent [19]

Acquaviva

[11] Patent Number: 4,480,824
[45] Date of Patent: Nov. 6, 1984

[54] RESTACK JAM DETECTION
[75] Inventor: Thomas Acquaviva, Penfield, N.Y.
[73] Assignee: Xerox Corporation, Stamford, Conn.
[21] Appl. No.: 358,080
[22] Filed: Mar. 15, 1982
[51] Int. Cl.³ .......................... B65H 1/30; B65H 7/14
[52] U.S. Cl. ..................................... 271/3.1; 271/171;
271/258; 271/223; 250/223 R
[58] Field of Search ............... 271/207, 223, 224, 258,
271/259, 171, 3.1, 4, 3, 215; 340/674; 250/223
R, 561

[56]        References Cited
        U.S. PATENT DOCUMENTS

| | | | |
|---|---|---|---|
| 2,124,858 | 7/1938 | Marchand | 271/87 |
| 2,525,311 | 10/1950 | Peyrebrune | 271/215 |
| 2,707,142 | 4/1955 | Waite | 271/215 |
| 3,790,158 | 2/1974 | Summers et al. | 271/4 |
| 4,022,460 | 5/1977 | Pritchett | 271/258 |
| 4,076,408 | 2/1978 | Reid et al. | 355/14 |
| 4,084,900 | 4/1978 | Yamaoka et al. | 355/14 |
| 4,099,860 | 7/1978 | Connin | 355/14 |
| 4,229,650 | 10/1980 | Takahashi et al. | 250/223 |
| 4,256,297 | 3/1981 | Prieur et al. | 271/207 |
| 4,365,151 | 12/1982 | Fasig et al. | 250/222 |

Primary Examiner—Bruce H. Stoner, Jr.
Assistant Examiner—James E. Barlow

[57]        ABSTRACT

In a sheet handling apparatus in which flimsy sheets are stacked on top of a stack thereof, particularly in a recirculating automatic document handler for a copier, there is disclosed an improved mis-stacking detection system comprising an optical sensing system defining a sheet interruptable optical sensing path extending transversely above the sheet stack in a position to be interrupted by variously mis-stacked non-planar sheets extending above the stack, which the optical sensing system is connected to a time delay system and a sheet mis-stacking indicator such that activation of the mis-stacking indicator is prevented for brief interruptions of the optical sensing path corresponding to normal sheet stacking, but is activated by an interruption of the optical sensing path which continues for a preset time period indicative of the presence of a mis-stacked sheet. The optical sensing path extends angularly between, transversely over, the stack support from one side to the other and from adjacent one end thereof towards the opposite end thereof, but automatically accommodates the resetting of the sheet restacking edge guides for different sheet sizes.

6 Claims, 5 Drawing Figures

RESTACK JAM DETECTION

The present invention relates to a sheet handling apparatus in which sheets are stacked, with improved sheet mis-stacking detection.

Especially for the faster xerographic and other document copiers now in commercial use, it is increasingly desirable to provide for the automatic handling of the individual original document sheets being copied, in order to more fully utilize the higher copying speed capabilities of these copiers. It is particularly desirable to rapidly automatically feed, register and copy document sheets of a variety or mixture of sizes, types, weights, materials, conditions and susceptibility to damage, yet with minimal document jamming, wear or damage by the document handling apparatus. Yet it is also desirable that the document handling units be as compact, simple and lightweight as possible. This is especially desirable where, as conventionally practiced, the entire document handling unit is pivotally mounted over the existing copier platen to be liftable by the operator to facilitate alternative manual document placements on the platen.

A known desirable feature for an automatic document handling system for a copier is to provide document recirculations for precollation copying. Such precollation copying systems provide a number of important advantages. The copies exit the copier into a set collector already in precollated sets, and do not require subsequent sorting in a sorter or collator. On-line finishing and/or removal of completed copy sets may be provided while additional copy sets are being made from the same document set. Also, a complete copy proof set is available from the first document set circulation. Any desired number of such copy sets may be made by making a corresponding number of recirculations of the document set in collated order past a copying station and copying each document once each time it recirculates. Examples of such systems are further described in the patent literature cited hereinbelow.

However, a disadvantage of precollation copying systems is that the documents must all be repeatedly recirculated and repeatedly individually copied a number of times equivalent to the desired number of copy sets. For example, to make 10 copy sets of a 5 page document set or book, one copy at a time can be made of each of the 5 document pages in this order: pages 1, 2, 3, 4, 5; 1, 2, 3, 4, 5; (or the reverse page order) repeated a total of 10 times to make the desired 10 copy sets. Thus, increased document recirculations are necessitated for a precollation copying system, with consequent increased likelihood of document jams and document wear, image smearing, or damage, particularly if the document feeding paths are lengthy, interrupted, or excessively arcuate.

So-called recirculating document handlers (RDH's) perform the complex function of manipulating the document original in a controlled manner for precollation copying. In a typical commercial recirculating document handler, document sheets are placed by the copier user in normal collated order in a copier stacking tray over a platen and then sequentially fed from the bottom of that tray to a conventional platen where they are imaged onto a photoreceptor. After one side of the original has been copied, the document is returned to the top of the stack in the stacking tray via a return feed path. Moving the document around this loop or racetrack feed path at high speeds becomes difficult, particularly if the copier is to handle a variety of sizes, weights and conditions of papers. In particular the restacking of documents in the paper tray becomes difficult. The restacking must be accomplished at the recirculation rate and must return the documents in the proper stacked orientation for refeeding.

The problem of properly landing a series of documents in a copier stacking tray is much more than a problem in free fall dynamics. The trajectory of the document must be controlled so that the document is not damaged and so that the document hits a landing area and stops in the approximate registration position so that it can be recaptured by the feeder and refed to be recirculated past the platen for copying at the proper position (alignment) on the platen. Document sheet restacking is affected by the document sheet velocity, mass, stiffness, "airfoil" shape (includng induced or accidental curls on one or both axis) etc. Furthermore, original documents are typically flimsy sheets which easily and typically change shape when released for restacking. All of these characteristics affect the "flight" of the document being restacked and its settling position.

Some examples of art disclosing recirculating document handlers for a copier with a stack, and means for returning and restacking the documents on the stack for precollation copying, are shown in U.S. Pat. Nos. 4,278,344 issued July 14, 1981 to R. B. Sahay; 4,270,746 issued June 2, 1981 to T. J. Hamlin and 4,076,408 issued Feb. 28, 1978 to M. G. Reid, et al.. The latter patent is of particular interest for the optical detector 149,151 in the document tray, etc.. A similar disclosure is in U.S. Pat. No. 4,099,860 issued July 11, 1978 to J. L. Connin.

A document photodetector 402, 405, etc. is provided in the return document portion of the document supplying area in the document handler system disclosed in U.S. Pat. No. 3,790,158 issued Feb. 5, 1974 to J. E. Summers, et al..

The art also includes various other patents teaching document handlers and also control systems therefor, including jam detection in some cases, such as U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270.

In other applications, in jam detectors for copy sheets, it is known to provide a photoelectric jam detector with a timing circuit providing a jam indicating state after a timing cycle, e.g. U.S. Pat. Nos. 4,022,460 issued May 10, 1977 to W. W. Pritchett and 4,084,900 issued Apr. 18, 1978 to S. Yamaoka, et al..

Conventional simple software instructions in the copier's general microprocessor logic circuitry and software of document handler and copier control functions and logic, as taught by the above and other patents and various commercial copiers, are well known and preferred. However, it will be appreciated that the document functions and controls described herein may be alternatively conventionally incorporated into a copier utilizing any other suitable or known simple software or hard wired logic systems, switch controllers, etc.. Such software for functions described herein may vary depending on the particular microprocessor or microcomputer system utilized, of course, but will be already available to or readily programmable by those skilled in the art without experimentation from the descriptions provided herein.

The present invention may be used in cooperation or combination with various document restack transport systems, as, for example, that disclosed in U.S. patent application Ser. No. 317,630 filed Nov. 2, 1981 by M. S. Doery, et al, now U.S. Pat. No. 4,436,301 issued Mar. 13, 1984.

All references cited herein, and their references, are incorporated by reference herein for appropriate teachings of additional or alternative details, features, and/or technical background.

The present invention overcomes or reduces various of the above-discussed problems. In particular, a preferred feature disclosed herein is to provide, in a sheet handling apparatus in which flimsy sheets are stacked on top of a stack thereof in a generally horizontal stack support tray between generally vertically extending spaced apart side guide members by being fed in over the top of said stack from one end thereof and released to normally generally planarly stack on top of said stack, the improvement for detecting mis-stacking comprising: optical sensing means defining a sheet interruptable optical sensing path extending transversely above said stack positioned to be interrupted by mis-stacked non-planar sheets variously extending above said stack; sheet mis-stacking indicator means connected to be actuated by said optical sensing means by interruption of said optical sensing path; and timing means operatively connecting with said optical sensing means and said mis-stacking indicator means to prevent activation of said mis-stacking indicator means by brief interruptions of said optical sensing path from said normal stacking and to allow an activation of said mis-stacking indicator means by an interruption of said optical sensing path continuing for a preset time period indicative of the presence of a mis-stacked sheet.

Further desirable features which may be provided by the apparatus disclosed herein include embodiments in which said optical sensing path extends angularly between said side guides and from adjacent said one end of said stack towards the opposite end of said stack to detect variously mis-stacked document sheet positions, or embodiments in which one said side guide member is fixed and the other said side guide member is repositionable to adjust to different sheet sizes, and wherein said optical sensing means comprises a fixed light beam emitter and detector means closely associated with said fixed side guide member and a light reflector means on said repositionable side guide member for normally reflecting the light beam from said light beam emitter back to said light beam detector to form said optical sensing path irrespective of the repositioning of said repositionable side guide member, or in which said optical sensing means is integral a restacking portion of a recirculating document handler for a copier for detecting mis-stacking of original document sheets being recirculatively copied.

Further desirable features and advantages pertain to the specific apparatus and steps of operation whereby the above-mentioned and other features and advantages may be attained, including the examples described hereinbelow.

The invention will be better understood by reference to the following description of a specific example thereof, which includes the following drawing figures (approximately to scale) wherein.

Figure 1:
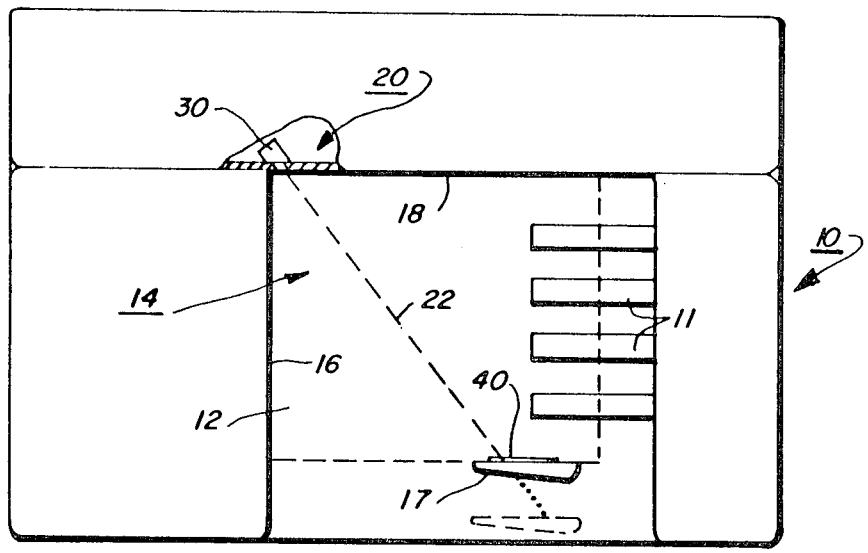
FIG. 1 is a top view of an embodiment of an exemplary document sheet handling apparatus with mis-stacking detection in accordance with the present invention.
Figure 2:
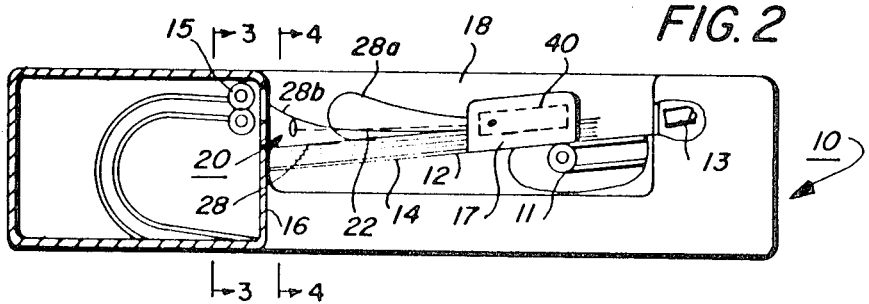
FIG. 2 is a side view of the embodiment of FIG. 1 with the side open for clarity.
Figure 5:
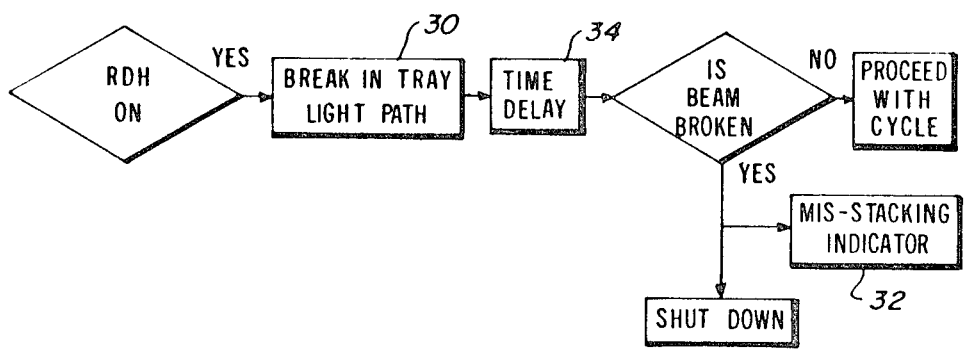
Figure 3:
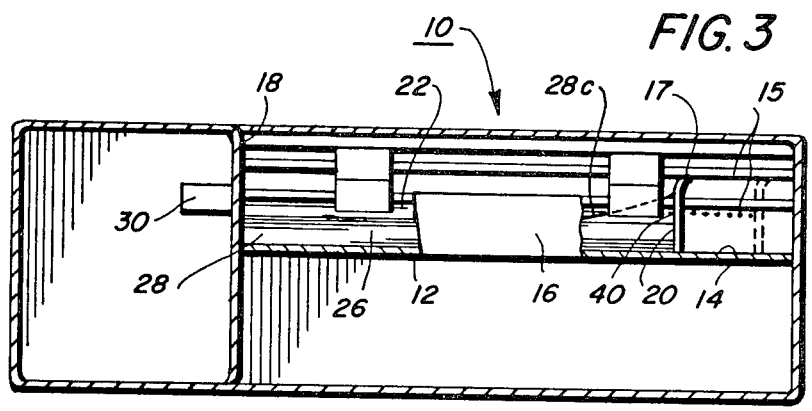
Figure 4:
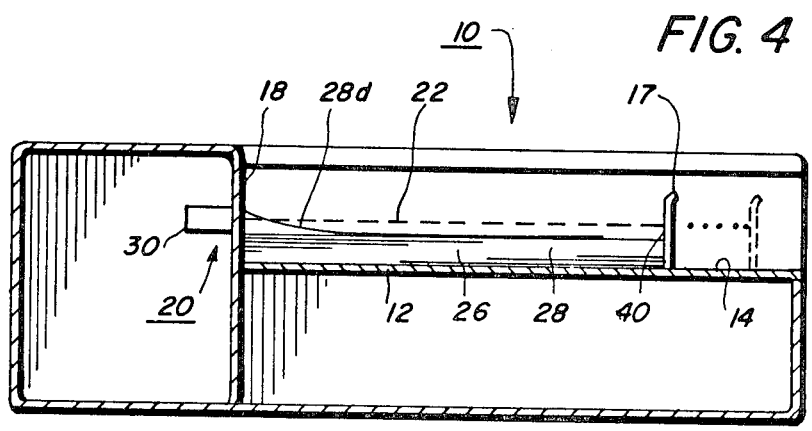

FIGS. 3 and 4 are cross-sectional end views taken generally along the lines 3—3 and 4—4 of the FIG. 2 view; and FIG. 5 is a functional schematic drawing of an exemplary electrical control system of the embodiment of FIGS. 1-4.

The exemplary document sheet handling system 10 disclosed in FIGS. 1-4 may be conventional except as described herein, and may be mounted to any conventional copier. Furthermore, the present system is applicable to numerous other sheet restacking systems, of which this is merely one example.

The sheet handling system 10 here is an over-platen recirculating document sheet handler for precollation copying, in which a stack 26 of document sheets 28 are loaded into the generally horizontal and planar bottom surface 14 of a restacking tray 12 to be fed seriatim from the bottom of the stack 26 by a vacuum belt or other output feeder 11, preferably assisted by an air knife 13, both of which are at the front or downstream edge of the stack. Each sheet 28, after it has been fed out to the copier platen and copied, is returned via a restacking feeder or transport 15 which feeds the returning sheet in over the top of the stack 26 from the rear of the stack and releases the sheet to restack by setting down on top of the stack between aligning edge guide members 17 and 18. Thus, the sheets can be continuously recirculated in the same order as often as desired.

Note that in FIG. 1 no stack of sheets is present for drawing clarity. In FIGS. 2, 3 and 4 a stack 26 of maximum size is shown, with two mis-stacked individual sheets 28a and 28b on top of the stack in FIG. 2, and one mis-stacked sheet 28c and 28d in each of FIGS. 3 and 4, respectively, thereby illustrating four different common sheet mis-stacking conditions to which the mis-stacking system herein is responsive.

Integral the document handler 10, as a part of the restacking system, is an optical sensing system 20, for detecting a document mis-stacking in the restacking tray 12. The optical sensing system 20 provides a sheet interruptable optical sensing path 22, illustrated by dashed lines in the Figures. This optical path 22 extends across the restacking tray 12 spaced above the bottom surface 14 thereof by a distance which is above the maximum heighth of the stack 26 of document sheets 28 in the restacking tray 12. An incoming individual sheet 28 being restacked on the document stack 26 is monitored by the optical sensing system 20 and its connecting electrical mis-stacking indicator means 32 and timing means 34, as functionally exemplified in FIG. 5. The overall system is responsive to the continued presence of a document sheet 28 in the optical sensing path 22 indicative of a document which is mis-stacked, i.e. not properly settled into the restacking tray 12. The system is so designed as to not be responsive to temporary or intermittent disruption of the sensing path 22 by a normally restacking sheet.

By way of background, recirculating document handlers such as the document handler 10 typically have various sensors in the document circulation path to detect the presence or absence of a document sheet at a given time. In this manner a determination can be made by the machine controller logic as to whether a sheet is jammed or is otherwise delayed in passing the sensor location. However a critical location which has heretofore not been adequately monitored is the document tray, and in particular the continuous restacking of document sheets in that tray, which is essential to document recirculation. Experience in recirculating document handlers has indicated that document sheets can jam in the restacking tray itself while restacking or settling on the document stack, i.e. before the next feed-out cycle for the document sheets.

As illustrated by 28a–28d the possibilities for such document sheet restacking jam conditions include skewed sheets, sheets which are partially rolled over, sheets which stack leaning against one side wall or end wall of the document tray, or crumpled or torn sheets, etc.. The danger of such sheet mis-stacking conditions is especially great for the restacking of large and/or light-weight sheets. It is also additionally aggravated by the use of an air assisted document feeder, such as a document feeder utilizing an air knife 13 directed at the document stack for assisting in the separation and feeding of the bottom document sheet while sheets are being restacked on the top of the stack. An example of the latter is disclosed in the abovecited U.S. Pat. No. 4,270,746. This is the type of feeder which would desirably be utilized with the document handler 10 example herein. Such a feeder introduces air flow patterns which can affect the document settling in proportion to their magnitude and timing, and in relation to the shape or charateristics of the document sheet as it is restacking.

The positions of mis-stacked document sheets 28a–28d in FIGS. 2, 3 and 4 illustrate some of the above-described document sheet mis-stacking conditions. In FIG. 2 one such sheet 28a is shown rolled over or folded and another sheet 28b is shown with its trail edge area hung up on the rear wall 16 of the restacking tray 12. FIG. 3 illustrates a document sheet 28c with one edge hung up or resting on the movable side guide 17 of the tray. FIG. 4 illustrates a document sheet 28d laterally mis-stacked so that one edge is leaning up against the fixed side guide or side wall 18 of tray 12.

The optical sensing system 20 herein is capable of detecting all of the above-described, and many other, mis-stacking conditions of document sheets, with a single optical sensing path 22 in a simple and low cost sensing system. The optical sensing system 20 is so positioned with respect to the stack 26 and tray 12 as to detect all of the four jam conditions described above yet not be actuated by, or respond to, normal or proper restacking or settling of document sheets. The optical sensing path 22 here spans the tray 12 from side guide 17 to side guide 18 in a transverse or skewed path also extending from at or adjacent the rear wall 16 of the tray to adjacent the front of the tray.

While a conventional integral light source and sensor unit 30 is disclosed here in the fixed side wall 18, it will be appreciated that it may alternatively be located in an adjacent portion of the rear wall 16, if desired. The unit 30 provides a light beam (which may be infra red) forming the optical sensing path 22. The reflected light of that beam is sensed by the sensor unit 30 and electrically amplified in a conventional manner, to provide an electrical signal output indicative of the interruption or noninterruption of the light beam defining the optical sensing path 22. This light beam is so positioned as to be broken only briefly and intermittently by normally restacking sheets yet to be broken for a longer period of time or indefinitely by a mis-stacking sheet in the tray 12. The sensor unit 30 is electrically connected to circuitry 32 providing a sheet mis-stacking indication in response to interruption of optical sensing path 22 by a mis-stacked sheet. Electrically connecting with the optical sensing unit 30 and the mis-stacking indication means 32, as functionally illustrated in FIG. 5, is a conventional timing circuit or time delay circuit 34 operatively interrelating the two as will be described. The time delay circuit 34 prevents actuation of the mis-stacking indicating means 32 by interruptions for only a brief time period (a fraction of a second) of the optical sensing path 22 corresponding to the time period for normal sheet restacking, but provides activation of the indicator means 32 by an interruption of the optical sensing path 22 which continues for a preset time period (beyond the time period preset into the time delay 34) to thereby provide an indication from the indicator means 32 of the presence of a mis-stacked document sheet. It may be seen that no elaborate or unconventional electronic logic is required. In fact, it can be implemented with the existing programmable microprocessor logic available in modern commercial copiers by using software instructions to provide the time delay 34 and a jam indication and machine control instructions to shut down the document handler, and, if desired, to shut down the copier accordingly (indicated by the "shut down" condition in FIG. 5). The "jam indicator" may be the shut down itself and/or any of various indicators such as a lighted display panel with coded or printed instructions, voice synthesis instruction, or the like. Also note that the shut down cycle may be of the more sophisticated "soft" type currently known, such as allowing the copying to continue for the documents which have been fed and restacked properly and initiating total machine shut down only at or before the anticipated feeding of the mis-stacked document (since document and copy sheet counting and comparison circuitry is already conventionally provided and available).

It will also be appreciated that the logic system disclosed herein may be integrated with other available machine logic for further features. For example, the system need not be actuated except during the actual running time of the restacking operation of the document handler 10. That is, only during the time period in which sheets are being fed through the restacking feeder 15 into the tray. This would automatically preclude improper actuation of a jam indication during the operator loading of the document tray. However, document misloading by the operator can be detected as soon as the system is actuated, i.e. upon startup of the document handler, thereby providing an additional feature.

In order for a recirculating document handler to provide for copying of different sizes of documents, one of the side guides 17 here must be repositionable to accommodate the different document dimensions. A desirable feature of the system disclosed herein is that none of the electrical or active optical components of the optical sensing system 20 need be mounted in this movable side guide 17, even though the optical sensing path 22 extends to and from this side guide 17 to span the full actual operating dimensions of the tray 12. This is provided here by the utilization of a purely passive optical reflector 40 on the portion of the side guide 17 to which the light beam from the light source unit 30 is directed. This can be inexpensive light reflecting tape of well known commercial types, or other suitable light reflective material. Alternatively, the reflector 40 can be a strip of plastic embossed or molded with a multifacetted fresnel or other reflector providing a suitable spectral reflection at the desired angle.

Although not essential, it is noted that the disclosed optical sensing path extends slightly downwardly from the light source 30 and that the light beam is reflected upwardly toward the unit 30. This can be utilized to reduce the sensitivity of the system to external light sources.

It may be seen with the above system that regardless of the type or location of the jam or mis-stacking of the document sheet, that if any portion of the document sheet extends significantly above the plane of the top of the document stack 26 that it will interrupt the optical sensing path 22 at some portion thereof, in almost all cases, and in particular in the most likely mis-stacking situations disclosed in FIGS. 3–5.

The light reflector 40 on the repositionable side guide 17 is sufficiently large so that even though it moves on an axis which is different from that of the sensing path 22, it will continue to provide a reflection back to the sensor unit 30 therefrom regardless of its position. As particularly shown in FIG. 1, the reflector 40 is sufficiently wide to accommodate the resulting shift in the point of reflection. Note the dashed line alternative position of the side guide 17 shown in FIGS. 1, 3 and 4 and the resulting change in path length 22 shown by a dotted line extension. Thus with this system, the optical sensing path 22 is automatically increased or decreased with the movement of the side guide 17 to maintain coverage for mis-stacking detection over the full portion of the tray into which any selected size of documents are being restacked, yet is insensitive to interruption of the light beam outside of that selected area. Furthermore it may be seen, particularly from FIGS. 1 and 2, that the optical sensing path 22 does not extend over the very front edge area of a document stack. That is, the light beam does not detect upward movement of the very front edge of the stack of documents over the document output feeder 11. Thus it is not sensitive to potential fluttering of the top of the document stack by air from the air knife 13.

It is important to note that the above system, unlike various of the prior art references cited above, is not actuated in response to the presence or absence of a document sheet or sheets normally stacked in the restacking tray 12. Nor is it responsive to the normal feeding or restacking of document sheets in and out of the tray 12. It is responsive only to one or more mis-stacked sheets i.e. sheets which have failed to restack properly after allowing for a normal settling time appropriate for the largest and lightest sheets to be recirculated. The system is not triggered by even a large, slow-settling sheet, providing it does settle properly, coming to rest substantially planarly on top of the stack in the tray within the preset allowed time period. Furthermore, complete settlement is not required, and the subsequent sheet may be being fed in from the rear of the stack by the restacking feeder 15 as settlement of the prior sheet is occurring. Note that the opening, or absence of a break, in the optical sensing path 22 for even a brief interval can be utilized to reset the time delay circuit 34 and thereby prevent a jam indication. I.e. a jam indication will not be provided until the beam has been continuously interrupted for the preset time delay period.

It will be appreciated that the embodiment described herein is merely exemplary, and that numerous other variations, modifications, refinements or alternatives will be apparent to those skilled in the art from the disclosures herein. They are intended to be encompassed by the following claims:

I claim:

1. In a sheet handling apparatus in which flimsy sheets are stacked on top of a stack thereof in a generally horizontal stack support tray between generally vertically extending spaced apart side guide members by being fed in over the top of said stack from one end thereof and released to normally generally planarly stack on top of said stack, the improvement for detecting mis-stacking comprising: optical sensing means defining a sheet interruptable optical sensing path extending transversely above said stack positioned to be interrupted by mis-stacked non-planar sheets variously extending above said stack; sheet mis-stacking indicator means connected to be actuated by said optical sensing means by interruption of said optical sensing path; and timing means operatively connecting with said optical sensing means and said mis-stacking indicator means to prevent activation of said mis-stacking indicator means by brief interruptions of said optical sensing path from said normal stacking and to allow an activation of said mis-stacking indicator means by an interruption of said optical sensing path continuing for a preset time period indicative of the presence of a mis-stacked sheet; in which one said side guide member is fixed and the other said side guide member is repositionable to adjust to different sheet sizes, and wherein said optical sensing means comprises a fixed light beam emitter and light beam detector means closely associated with said fixed side guide member and a light reflector means on said repositionable side guide member for normally reflecting the light beam from said light beam emitter back to said light beam detector means to form said optical sensing path irrespective of the respositioning of said repositionable side guide member.

2. The sheet handling apparatus of claim 1 in which said optical sensing path extends downwardly from said light beam emitter towards said light reflector means.

3. The sheet handling apparatus of claim 1 in which said optical sensing path extends angularly between said side guides and from adjacent said one end of said stack towards the opposite end of said stack to detect variously mis-stacked document sheet positions.

4. The sheet handling apparatus of claim 1 in which said optical sensing path extends angularly over said stack support tray.

5. The sheet handling apparatus of claim 1 in which said optical sensing means is integral with a restacking portion of a recirculating document handler for a copier for detecting mis-stacking of original document sheets being recirculatively copied.

6. The sheet handling apparatus of claim 1 in which said timing means preset time period is less than approximately one second.

* * * * *